(12) United States Patent
Garrasi

(10) Patent No.: US 11,070,040 B1
(45) Date of Patent: Jul. 20, 2021

(54) QUICK CONNECT ELECTRICAL JUNCTION BOX

(71) Applicant: Robert Garrasi, Clifton Park, NY (US)

(72) Inventor: Robert Garrasi, Clifton Park, NY (US)

(73) Assignee: VELOX TECHNOLOGY CORPORATION, Clifton Park, NY (US)

( * ) Notice: Subject to any disclaimer, the term of this patent is extended or adjusted under 35 U.S.C. 154(b) by 0 days.

(21) Appl. No.: 17/159,584

(22) Filed: Jan. 27, 2021

(51) Int. Cl.
*H01R 13/512* (2006.01)
*H02G 3/08* (2006.01)
*H01R 24/76* (2011.01)
*H01R 13/66* (2006.01)
*H01R 25/00* (2006.01)

(52) U.S. Cl.
CPC .............. *H02G 3/08* (2013.01); *H01R 13/512* (2013.01); *H01R 13/665* (2013.01); *H01R 24/76* (2013.01); *H01R 25/006* (2013.01)

(58) Field of Classification Search
CPC .......... H02G 3/08; H02G 3/086; H02G 3/126; H01R 13/512; H01R 13/665; H01R 24/76; H01R 25/006; H01R 13/6395; H01R 24/525
See application file for complete search history.

(56) References Cited

U.S. PATENT DOCUMENTS

| | | | | |
|---|---|---|---|---|
| 3,609,647 A | * | 9/1971 | Castellano | H01R 24/76 439/535 |
| 6,220,880 B1 | * | 4/2001 | Lee | H01R 25/003 439/214 |
| 6,623,296 B2 | * | 9/2003 | Okamoto | H01R 31/02 439/535 |
| 7,160,147 B1 | * | 1/2007 | Stephan | H01R 9/24 174/60 |
| 7,989,699 B1 | * | 8/2011 | Shotey | H02G 3/14 174/53 |
| 8,690,601 B2 | * | 4/2014 | Perritt | H02G 3/126 439/535 |
| 9,564,725 B1 | * | 2/2017 | Moss | H01H 23/04 |
| 9,583,929 B1 | * | 2/2017 | Moss | H02J 3/00 |
| 9,917,431 B2 | * | 3/2018 | Moss | H02G 3/08 |
| 2002/0185296 A1 | * | 12/2002 | Schultz | H02G 3/14 174/53 |

(Continued)

*Primary Examiner* — Tho D Ta

(57) ABSTRACT

A Quick Connect Junction Box is disclosed. The Quick Connect innovation comprises a Junction Box having an insulating body with a cavity. The Junction Box is configured to securely fasten to a support surface. The Junction Box comprises an electrical circuit and one or more connectors. The electrical circuit has internal connections securely fastened within the insulating body and electrically connected to a power line using one or more conductors via input connections. The electrical circuit is formed with one or more conductive traces. The connectors are extended from the conductive traces. The outlet terminals are outwardly positioned at a center portion of the insulating body. The Quick Connect system further comprises an electrical component having an insulating body with an electrical circuit and connectors, affixed to the Junction Box via mounting tabs, thereby securely and electrically connecting the electrical component to the Junction Box via the outlet terminals.

14 Claims, 22 Drawing Sheets

(56) References Cited

U.S. PATENT DOCUMENTS

| | | | |
|---|---|---|---|
| 2015/0357762 A1* | 12/2015 | Green | H01R 25/006 |
| | | | 439/95 |
| 2018/0041015 A1* | 2/2018 | Moss | H02G 3/08 |
| 2020/0220293 A1* | 7/2020 | Cox | H01R 13/73 |
| 2021/0036473 A1* | 2/2021 | Moore | H02G 3/08 |

* cited by examiner

QUICK CONNECT ELECTRICAL JUNCTION BOX

BACKGROUND OF THE INNOVATION

A. Technical Field

The various embodiments that the applicant describes herein generally relate to a junction box that is part of an electrical system that is installed in a building or other structure. More specifically, the present innovation relates to a Quick Connect Junction Box configured to enable a user to quickly, safely, and inexpensively install and connect electrical components such as duplexes, outlets, switches, junction components, conductors/connectors, circuit breakers, wires, and/or other mechanical and electrical components or devices to a junction box. Central to the innovation itself is a new type of junction box configured in a novel and nonobvious way. This new Quick Connect Junction Box is designed to work systematically and seamlessly with the applicant's other two patents: the "Electric Power Distribution Panel," U.S. Ser. No. 10/862,277, (Garrasi [Dec. 8, 2020]), and the "Solid-State Electric Power Distribution Module," U.S. Ser. No. 10/887,964, (Garrasi [Jan. 5, 2021]). Although an integral part of the Velox patented electrical system, the Quick Connect Junction Box is also a stand alone innovation that can be used independently of the applicant's other two patented innovations, in retrofit or other non-Velox electrical system environments.

B. Description of Related Art

Installing electrical circuitry in a building typically involves routing wires from a circuit breaker panel to individual junction boxes throughout the building. Residential electrical wiring systems are unnecessarily complicated from hard-wiring scenarios requiring endless pig tails connected with wiring nuts, to adhering to electrical code standards.

The electrical system installed in most non-industrial buildings consists of single-phase power, corresponding to the end user's requirements. The electrical system for such buildings includes electrical components such as switches, outlets, junction boxes, wires, circuit breakers, connectors/conductors, and/or other electrical or mechanical components or devices.

However, existing conventional electrical wiring schemes have certain limitations and several inherent problems associated with the installation process. Skilled workers or licensed electricians are required for installing and wiring a conventional electrical system. The system's installation process is complex, labor-intensive, and potentially dangerous for the installer; it is also unnecessarily costly and expensive for builders and end-users. Thus there is a need for an improved and simplified junction box that can be installed by non-skilled workers (or even homeowners) without having to hire licensed electricians or skilled workers. Additionally, the installation process of the applicant's Quick Connect Junction Box is not only significantly quicker to install than conventional or legacy junction boxes, but the installation of the Quick Connect Junction Box is also significantly safer, as the box's design virtually eliminates the possibility of electric shock during installation.

Existing patent references unsuccessfully attempted to address the aforementioned problems. These references are cited as prior art in the background section of this non-provisional patent application and are discussed below.

The prior art found in U.S. Pat. No. 7,628,643 (Chrestos T. Pyrros [2009]), entitled "Modular electrical receptacle" discloses a modular electrical receptacle for permanent in-wall mounting that only requires a single connection to a power source. Pyrros's modular electrical receptacle includes a housing having a front surface with a first and a second electrical outlet. The housing further includes a first tab extending from a first end and a second end extending from a second end for securing the modular receptacle to an in-wall electrical box. The housing further includes a power link, such as a conductive extension, that connects directly to another module and provides the other module with access to a single source of power. The power link can be three links for connecting a positive line, a neutral line and a ground line to another module. The housing also includes a coupler for connecting the housing to a power link of another module. Again, three couplers are can be provided for the positive, neutral and ground lines. The power link(s) and coupler(s) can be on opposing sides of the module.

The prior art found in U.S. Pat. No. 7,410,379 (Norman R. Byrne [2008]), entitled "Multiple circuit receptacles" discloses a multiple circuit receptacle system that includes a junction block having an incoming female connector set adapted to be engaged with a cable assembly for supplying incoming power to the junction block. Byrne's junction block also has a further female connector set, electrically coupled to the incoming female connector set, that supplies power from the cable assembly. The incoming power consists of four separate circuits, each circuit having a hot, neutral and ground terminal. An electrical outlet receptacle block includes a series of outlet receptacles and connector sets selectively connectable to the further connector set of the junction block. Connection of the receptacle block to the junction block in one of various special orientations provides for electrical power from any one of the multiple circuits to be presented at the outlet receptacles.

However, existing electrical wiring schemes and methods for installing and wiring a switch or duplex outlet are manual, and risk electric shock if power is present during the installation process. As stated above, the present electrical wiring schemes are relatively complex and are labor-intensive to install, thus making their installation costly. The present electrical wiring systems also pose the risk of shock or electrocution to the installer or end user due to the possibility of faulty or impaired electrical connections. Also, these legacy system installs require additional equipment for checking faults in the circuits or devices.

Therefore, there is a need for a Quick Connect Electrical Junction Box that includes outlets for quickly and safely connecting electrical components without using wire nuts and/or special tools during the installation process. There is also a need for an inexpensive Junction Box that is simple in design and that can be safely installed in a building and connected to a power supply by contractors, or by unlicensed electrical workers, or even by end users. Further, there is also a need to provide a Junction Box that can eliminate or prevent electric shocks during the box's installation, thereby providing more safety for installers than is currently the case.

SUMMARY OF THE INNOVATION

The present innovation discloses a Quick Connect Electrical Junction Box. In one embodiment, the junction box is configured to enable a user to simply, safely, and quickly connect different electrical components during the installation of the electrical system in any type of building, to include residential, institutional, industrial, medical, commercial, office, or other type of building.

In another embodiment, the Junction Box comprises a junction box and an electrical component, e.g., a switch or an electrical outlet or other electrical component or device. In another embodiment, the electrical component, e.g., a switch or an electrical outlet is retainably and electrically connected to the Junction Box via the one or more connectors, respectively. In another embodiment, the Junction Box comprises an insulating body with a cavity. The Junction Box is configured to detachably fasten to a support surface using fasteners, adhesives, or other suitable connectors.

In another embodiment, the Junction Box comprises at least two sections such as a bottom section and a top section, wherein the bottom section and top section of the Junction Box are configured to securely affix via a friction fit and/or fasteners, thereby producing a joint which is held together by friction after the bottom section and top section are pushed together.

In another embodiment, the Junction Box is designed with an internal electrical circuit that distributes electrical power from an input power line to the other circuits or electrical loads, using one or more connectors via the electrical component, e.g., an electrical outlet or any other electrical component or device. In another embodiment, the Junction Box is further comprised of at least two channels at a top portion and bottom portion for receiving the input power line.

In another embodiment, the Junction Box comprises an electrical circuit with internal connections. In another embodiment, the input connections of the Junction Box could be, but are not limited to, push-in connectors. The electrical circuit is securely disposed within the insulating body and electrically connected to the input power line using one or more conductors via input connections through the wiring channel. In another embodiment, the Junction Box is configured to receive the connection of feed wires of the power line using one or more connectors through the wiring channel. In another embodiment, the electrical circuit is formed with one or more conductive traces to include, but is not limited to, a hot conductive trace, a neutral conductive trace, and a ground conductive trace. In another embodiment, the hot conductive trace, the neutral conductive trace, and the ground conductive trace are securely positioned within the insulating body using one or more fasteners, e.g., screws. In another embodiment, the electrical circuit with internal connections within the Junction Box is incorporated within the insulating body via a molding or assembly process.

In another embodiment, one or more connectors are extended from the hot conductive trace, the neutral conductive trace, and the ground conductive trace. In another embodiment, the connectors are outwardly positioned at a center portion of the insulating body of the Junction Box, thereby securely and electrically connecting the electrical component, e.g., an electrical socket. In another embodiment, the Junction Box further comprises interlocking electrical connectors or internal mating conductors at the side portion of the Junction Box enabling it to electrically connect an adjacent Junction Box, or boxes, to form a multi-junction box assembly that can connect to various electrical loads.

In another embodiment, the electrical component is securely affixed to a Junction Box using one or more fasteners, e.g., screws. In another embodiment, the electrical component is electrically connected to a Junction Box by connecting to the connectors. In another embodiment, the electrical component is at least any one of, but not limited to, a switch, a single pole single throw (SPST) switch, a three-way switch, a four-way switch, a dimmer switch, or another electrical component or device. In another embodiment, the electrical component is at least any one of, but not limited to, a duplex outlet, a GFI outlet, an arc fault outlet, or other electrical component or device.

In another embodiment, the conductive traces include, but are not limited to, the hot conductive trace, the neutral conductive trace, and the ground conductive trace, which are secured within the insulating body using one or more insulating plates, and fasteners, e.g., screws. In another embodiment, the insulating plates are configured to receive the conductive traces that include, but are not limited to, the hot conductive trace, the neutral conductive trace, and the ground conductive trace. The insulating plates could or may separate the conductive traces from each other, thereby improving the insulation strength and preventing short circuit faults within the internal connections. In another embodiment, the insulating plate further comprises at least one opening for allowing the connector of the hot conductive trace. In another embodiment, the insulating plate further comprises at least two openings for allowing the connectors of the hot conductive trace and the neutral conductive trace. In another embodiment, the insulating plate further comprises at least three openings for allowing the connectors of the hot conductive trace, the neutral conductive trace, and the ground conductive trace. In another embodiment, the insulating plates are designed in a different shape in order to receive the conductive traces. In another embodiment, the insulating plates are, or may be, made of a material that includes, but is not limited to, plastic and/or other suitable insulating materials. In another embodiment, the outlet terminals of an electrical component are metal conductors. In another embodiment, the outlet terminals of the electrical component are or may be metal blade style connectors.

In another embodiment, the Junction Box further comprises one or more mechanical latches, wherein the one or more mechanical latches are configured to securely support and retain the plugged Junction Boxes, which are formed as a multiple Junction Box assembly. In another embodiment, the one or more mechanical latches are molded to the insulating body of the Junction Box.

Other objects features and advantages of the applicant's innovation will become apparent from the following detailed description. It should be understood, however, that the detailed description and the specific examples, while indicating specific embodiments of the innovation, are given by way of illustration only, since various changes and modifications within the spirit and scope of the innovation will become apparent to those skilled in the art from this detailed description.

BRIEF DESCRIPTION OF DRAWINGS

The foregoing summary, as well as the following detailed description of the innovation, will be better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing, is applicable to the description of that method step or structure shown by that same numeral in any subsequent drawing herein.

FIG. 1 includes an electrical component and a junction box in an embodiment of the present innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

In another embodiment of the applicant's innovation.

DETAILED DESCRIPTION OF EMBODIMENTS

A detailed description of embodiments of the present innovation will now be given with reference to the Figures in this nonprovisional patent application. It is expected that the present innovation may be embodied in other specific forms without departing from its spirit or essential characteristics. The described embodiments are to be considered in all respects only as illustrative and exemplary, and not restrictive or exclusive.

Figure 1:
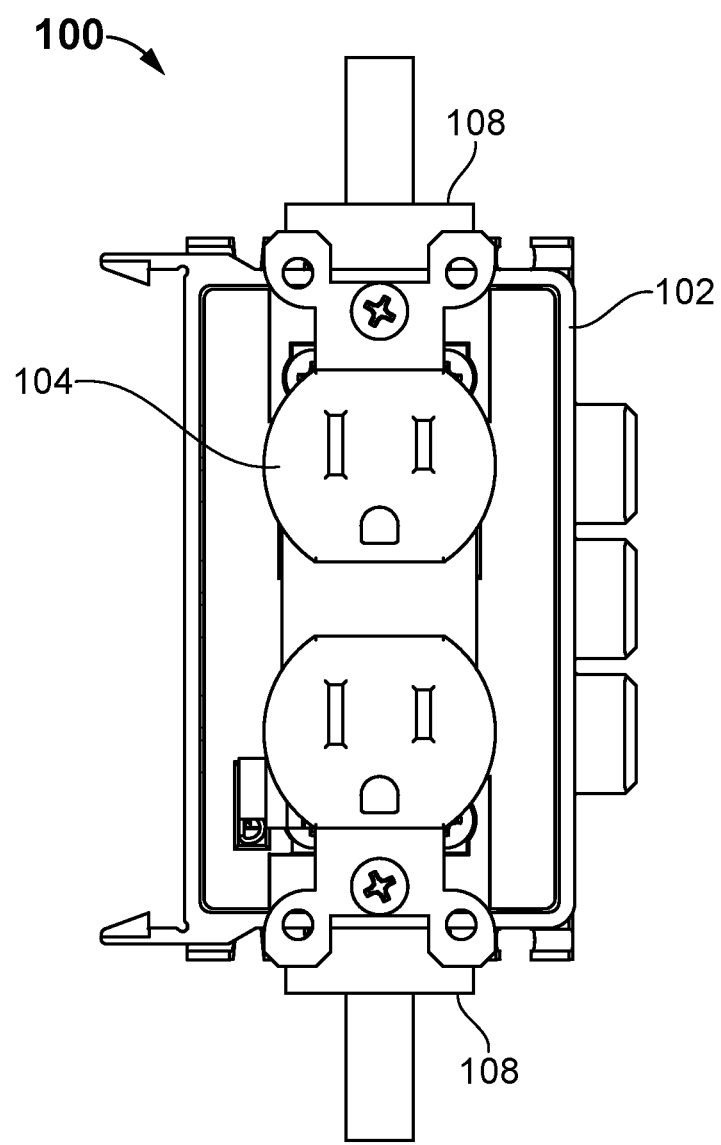
FIG. 1 illustrates a front view of a Quick Connect Junction Box.

FIG. 1 shows a Quick Connect Junction Box 100 comprised of a Junction Box 102 and an electrical component 104. In another embodiment, the Junction Box 100 is configured to enable a user to simply, safely, and quickly connect different electrical components or devices, e.g., an electrical socket or outlet for a wall, ceiling, office furniture, or floor installation, when these components are being installed as part of a building's electrical system. Such buildings would include residential, institutional, industrial, medical, office, or commercial buildings, or other structures, but may not be limited to same. In another embodiment, the electrical scheme 100 comprises a Junction Box 102 and an electrical component 104, e.g., a switch or an electrical outlet or other electrical component or device. In another embodiment, the electrical component 104, e.g., a switch or an electrical outlet or another device, is securely and electrically connected to the Junction Box 102 via one or more connectors 118 (shown in FIG. 3). In another embodiment, the Junction Box 102 comprises an insulating body 106 (shown in FIG. 2) with a cavity. The Junction Box 102 is configured to detachably fasten to a support surface using fasteners, adhesives, or other suitable connectors.

In another embodiment, the Junction Box 102 is shown with an internal electrical circuit that distributes electric power from an input power line or source to the other circuits or electrical loads using one or more connectors via an electrical component 104, e.g., an electrical outlet or other electrical device. In another embodiment, the Junction Box 102 further comprises at least two channels 108 at a top portion and bottom portion for receiving the input power line 130.

In another embodiment, the insulating body 106 of the Junction Box 102 shows the encapsulation of all circuit distribution conductors, terminating at the external and internal connection points. In another embodiment, the internal connections are incorporated into the insulating body 106 of the Junction Box 102 through a molding process or an assembly process. In another embodiment, the Junction Box 102 is configured to house and retain any one of the electrical components that may include, but are not limited to, single circuit switches, SPSTs, duplex outlets, three-way switches, four-way switches, GFI outlets, arc fault outlets, dimmer switches, light boxes, and a central distribution box based upon the internal circuitry molded into the insulating body 106, and as required by the wiring needs of a specific type of electric circuit. In another embodiment, the Junction Box 102 encapsulates all circuit distribution to the internal connections points or connection points mating up with the connectors of the electrical component or device 104 that is plugged into the Junction Box 102.

Figure 2:
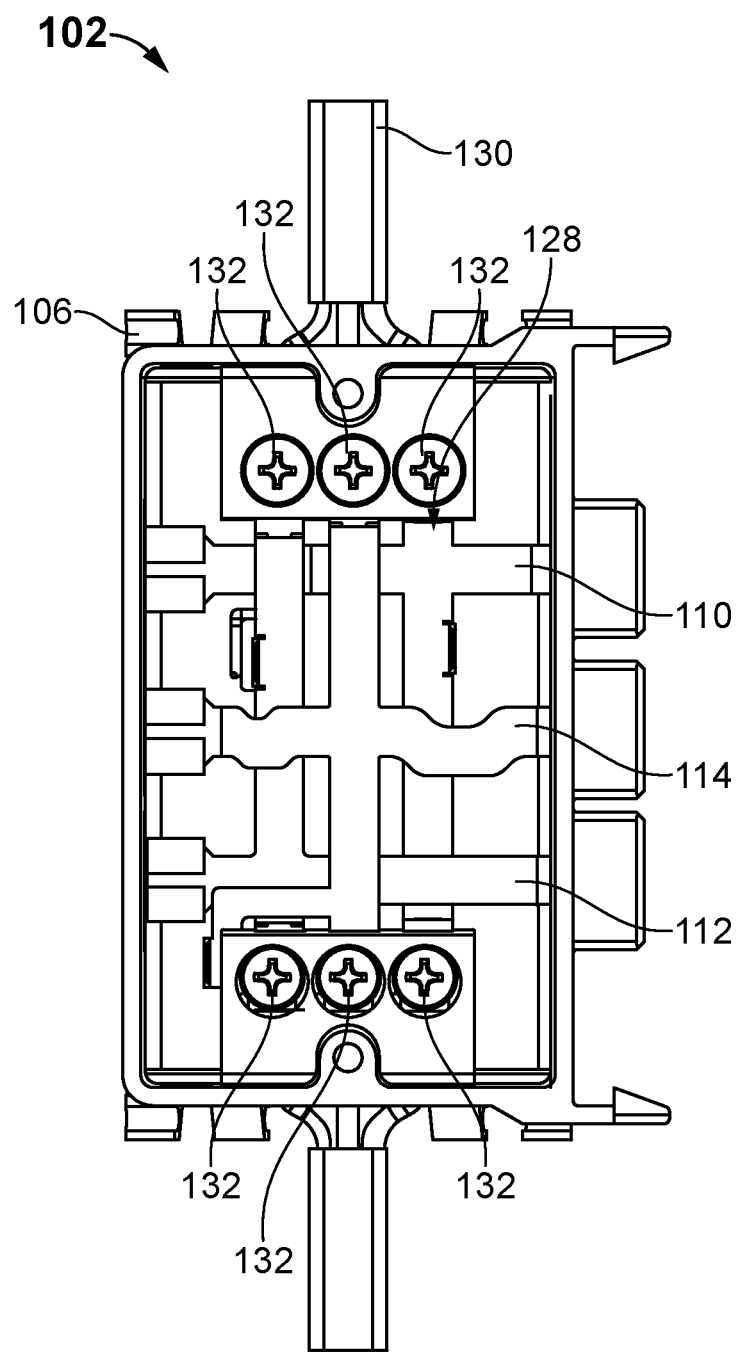
FIGS. 2-3 illustrate front views of the junction box that include an electrical circuit.
Figure 3:
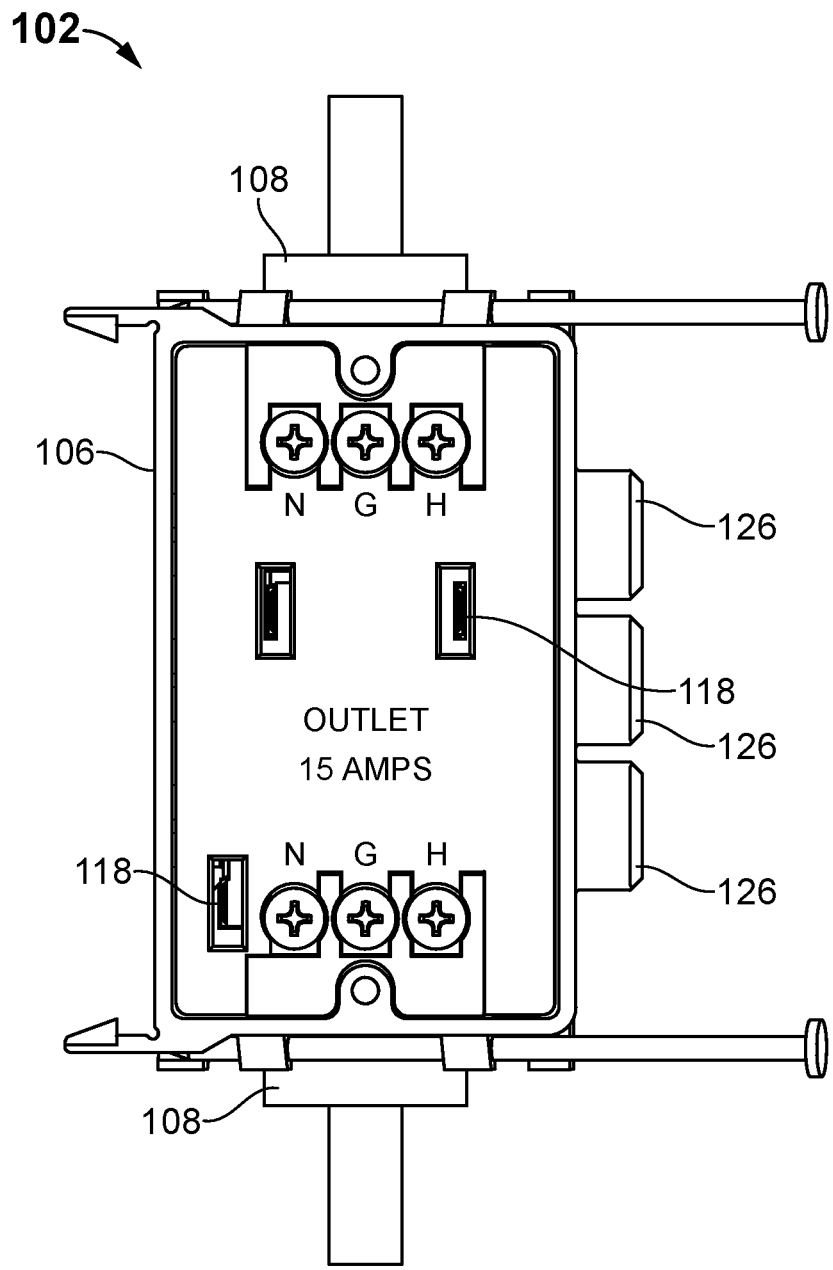

In another embodiment FIGS. 2-3 show the Junction Box 102 provided with an electrical circuit 128. In another embodiment, the Junction Box 102 comprises an electrical circuit 128 with internal connections. The electrical circuit 128 is securely retained within the insulating body 106 and electrically connected to the input power line 130 using one or more conductors via input connections through the wire channel 108. In another embodiment, the Junction Box 102 is configured to receive the connection of power line feed wires 130 using one or more connectors through the wire channel 108. In another embodiment, the electrical circuit 128 may be formed with one or more conductive traces that include, but are not limited to, a hot conductive trace 110, a neutral conductive trace 112, and a ground conductive trace 114. In another embodiment, the hot conductive trace 110, the neutral conductive trace 112, and the ground conductive trace 114 are securely retained within the insulating body 106 using one or more fasteners 132, e.g., screws. In another embodiment, the electrical circuit 128 with internal connections of the Junction Box is incorporated within the insulating body via a molding process or an assembly process.

In another embodiment, one or more connectors 118 are extended from the hot conductive trace 110, the neutral conductive trace 112, and the ground conductive trace 114. In another embodiment, the connectors 118 are outwardly positioned at a center portion of the insulating body 106 of the Junction Box 102, thereby securely and electrically connecting an electrical component 104, such as an electrical socket or other device. In another embodiment, the Junction Box 102 further comprises interlocking electrical connectors or internal mating conductors 126 at the side portion to enable an electrical connection to an adjacent Junction Box, or Junction Boxes, to form a multi-junction box assembly that can connect to various electrical loads.

Figure 4:
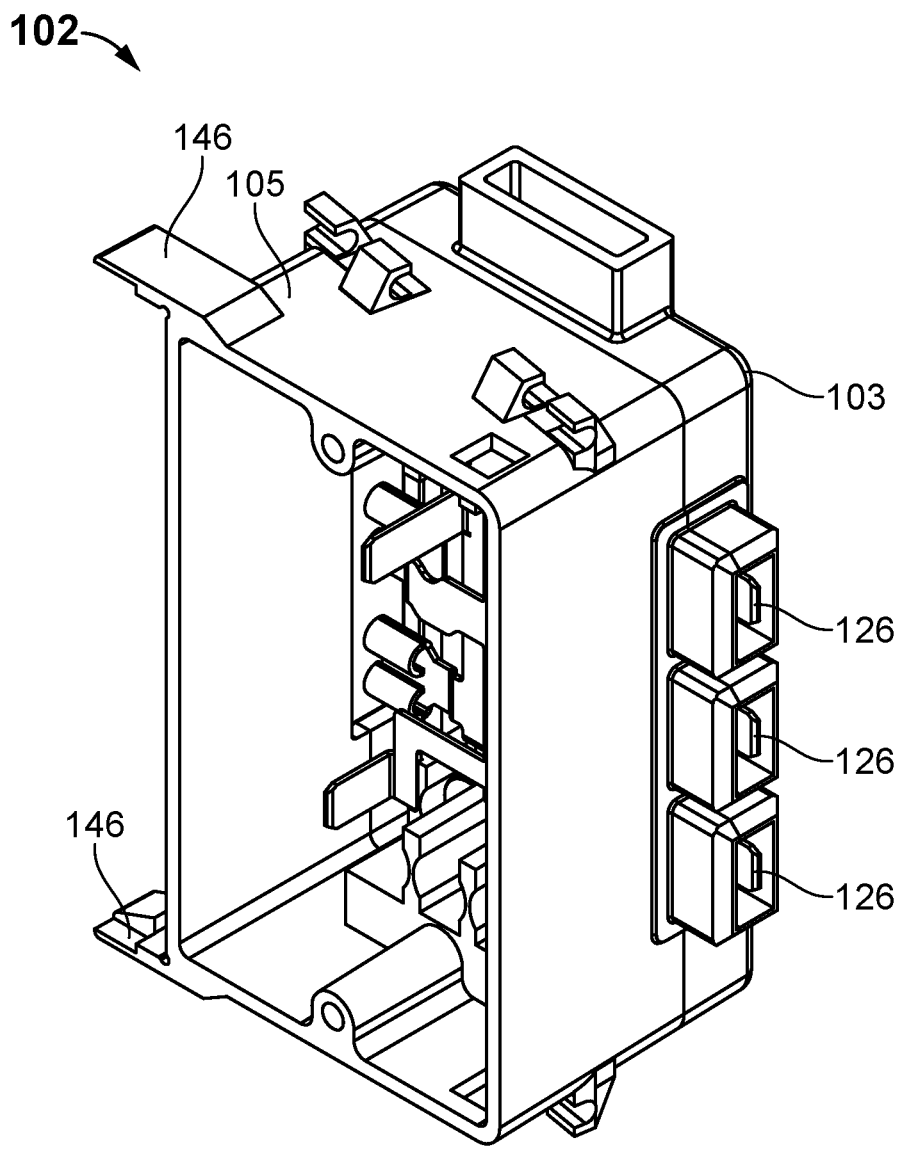
FIG. 4 illustrates a perspective view of the Quick Connect Junction Box.
Figure 5:
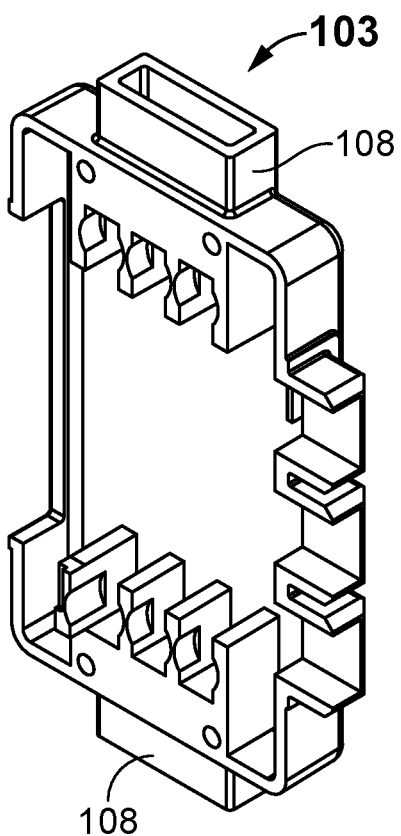
FIG. 5 illustrates a perspective view of a bottom section of the Junction Box.
Figure 6:
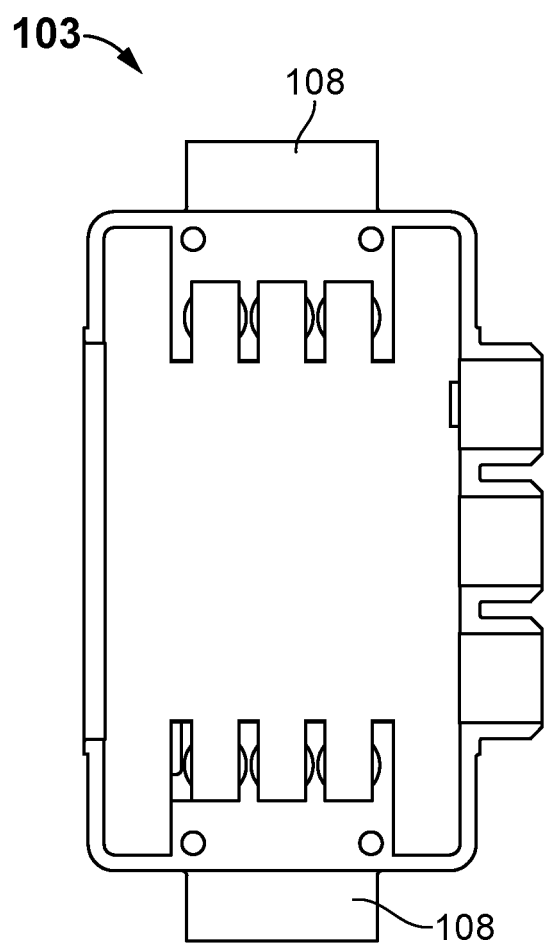
FIG. 6 illustrates a front view of the bottom section of the Junction Box.
Figure 7:
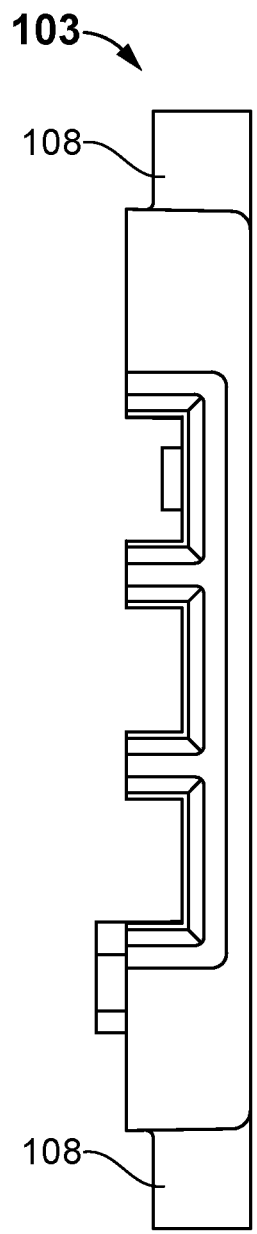
FIG. 7 illustrates a side view of the bottom section of the Junction Box.
Figure 8:
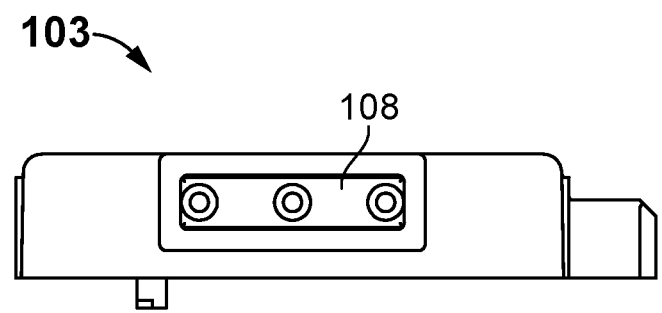
FIG. 8 illustrates a top view of the bottom section of the Junction Box.

FIG. 4 discloses another embodiment and refers to the Junction Box 102 of the Quick Connect Junction Box system 100. In another embodiment, the Junction Box 102 comprises at least two sections, such as a bottom section 103 and a top section 105, wherein the bottom section 103 and top section 105 of the Junction Box 102 are configured to be securely affixed, via a friction fit and/or fasteners, thereby producing an assembly which is held together by friction after the bottom section 103 and top section 105 are pushed together.

In another embodiment, the Junction Box 102 comprises mechanical latches 146. In another embodiment, the mechanical latches 146 are molded at the top portion and bottom portion of the top section 105 of the Junction Box 102. The mechanical latches 146 are configured to securely support the plugged in adjacent Junction Boxes, which are formed as a multiple junction box assembly. In another embodiment, the Junction Box 102 is molded from, but is not limited to, plastic and/or other suitable insulating materials. In another embodiment, the Junction Box 102 further comprises one or more interlocking electrical connectors 126. In another embodiment, the interlocking electrical connectors or internal mating conductors 126 at the side portion are configured to electrically connect to an adjacent Junction Box.

FIGS. 5-8 disclose another embodiment of the innovation and refer to the bottom section 103 of the Junction Box 102. FIGS. 5-8. In another embodiment, the bottom section 103 could be molded from, but is not limited to, plastic and/or other suitable insulating materials. In another embodiment, the bottom section 103 includes a plurality of recesses and tabs, which are extended from an inner wall surface of the bottom section 103 of the Junction Box 102. The plurality of recesses and tabs of the bottom section 103 are configured to receive the top section 105 of the Junction Box 102. In another embodiment, the bottom section 103 further comprises at least two channels 108, which are extended from a top portion and a lower portion for receiving the input power line 130.

Figure 9:
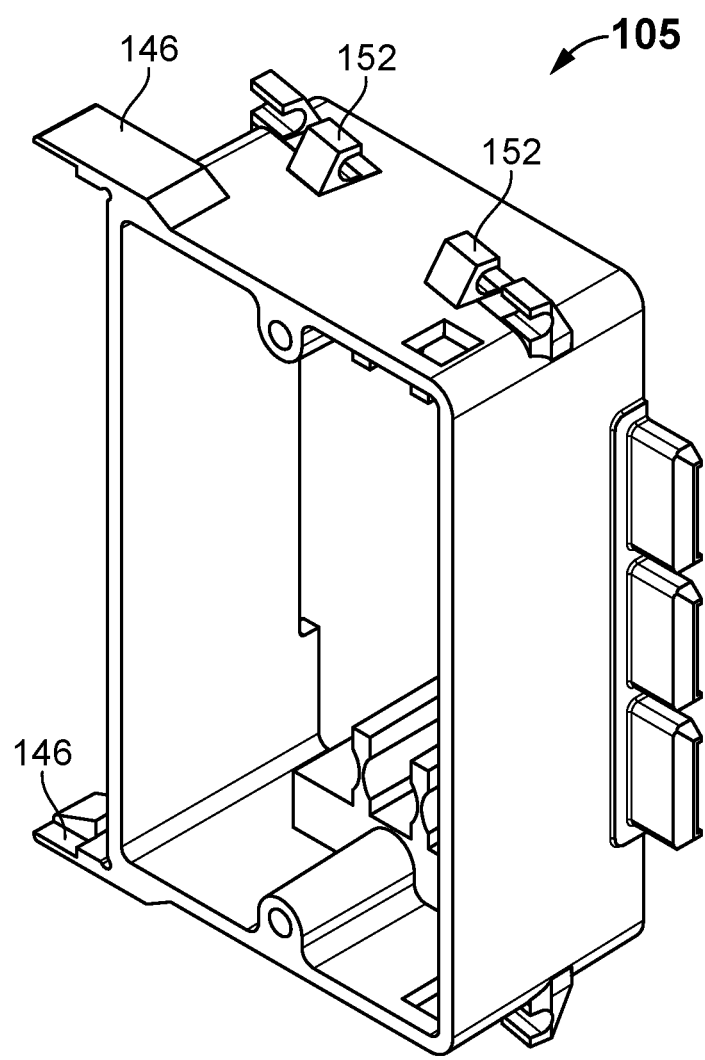
FIG. 9 illustrates a perspective view of a top section of the Junction Box.
Figure 10:
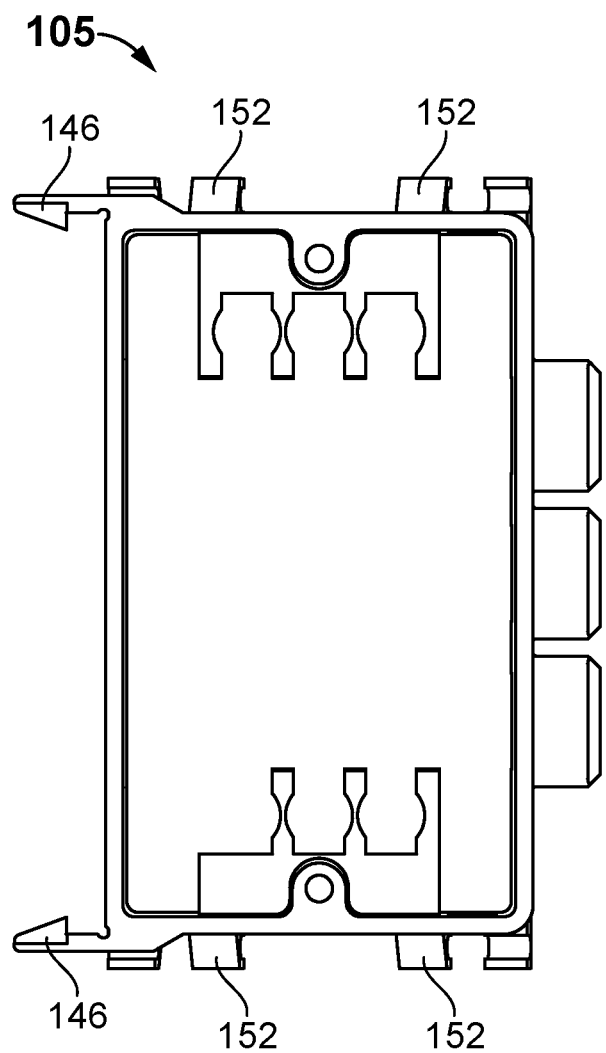
FIG. 10 illustrates a front view of the top section of the Junction Box.
Figure 11:
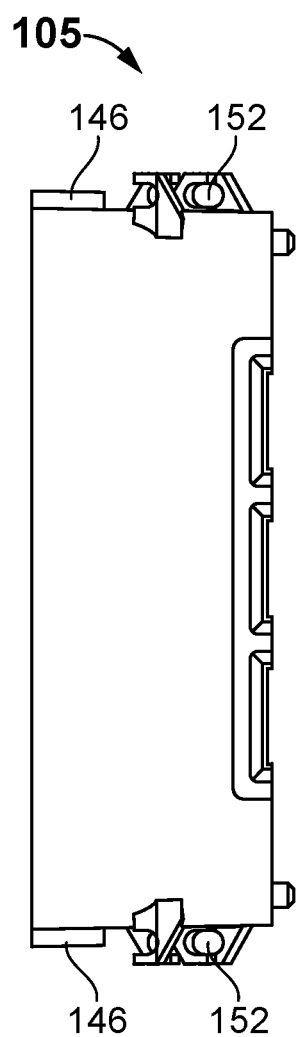
FIG. 11 illustrates a side view of the top section of the Junction Box.

FIGS. 9-11 disclose another embodiment of the innovation and refer to the top section 105 of the Junction Box 102. In another embodiment, the bottom section 103 could be molded from, but not limited to, plastic and/or other suitable insulation materials. In another embodiment, the top section 105 of the Junction Box 102 includes a plurality of recesses and tabs that are extended from the side wall surfaces of the bottom section of the Junction Box 103. In another embodiment, the top section 105 of the Junction Box 102 further comprises mechanical latches 146 and mounting tabs 152, which could be molded or extended from the top portion and bottom portion of the top section 105 of the Junction Box 102. This allows for securing the Junction Box 102 to a panel or a wall surface using fasteners, e.g., nails or other types of fasteners 154 (shown in FIG. 14).

Figure 12:
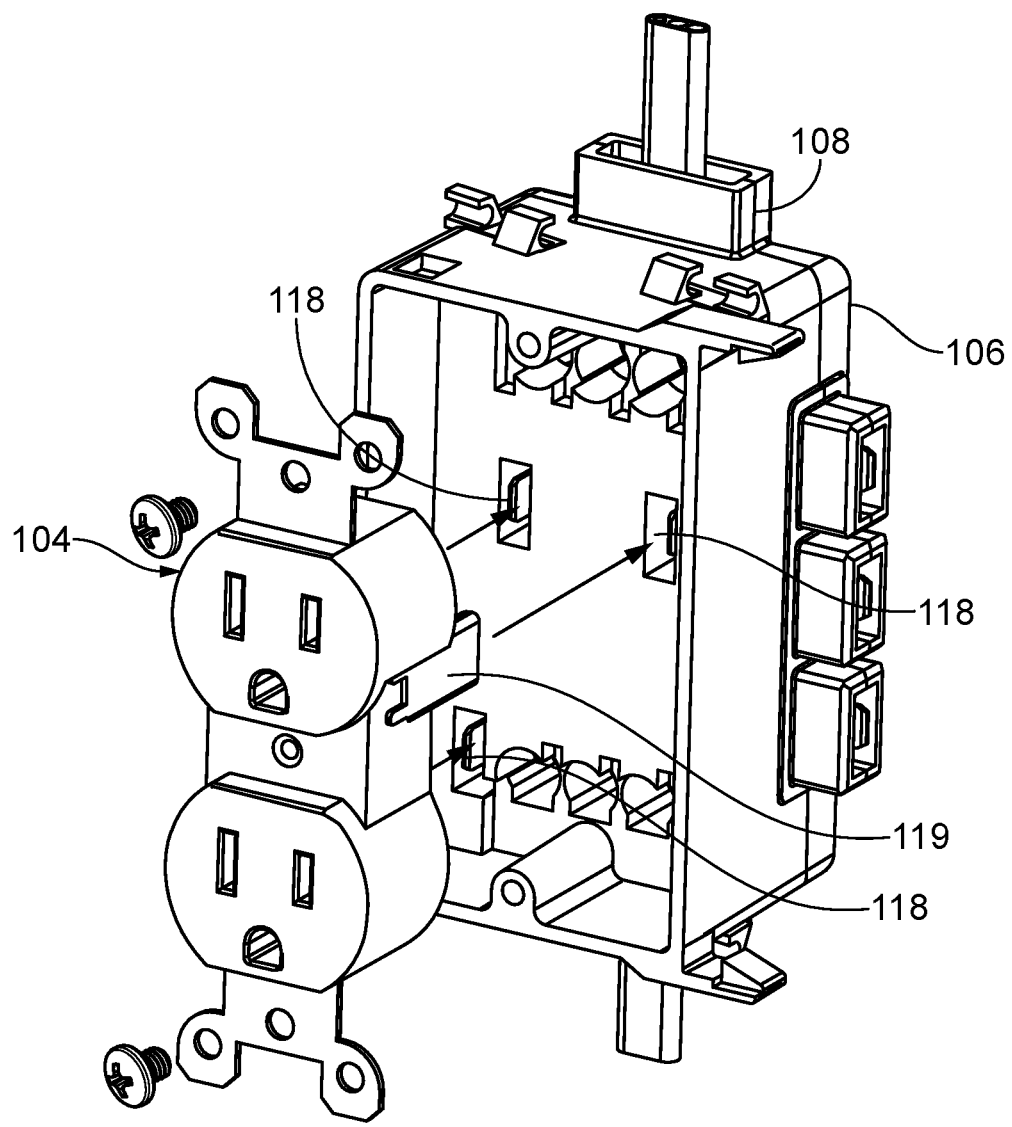
FIG. 12 illustrates a perspective view of the electrical component securely connecting to the Junction Box via tabs using one or more fasteners.

FIG. 12 discloses another embodiment of the innovation and refers to the electrical component 104 securely connecting to the Junction Box 102 via tabs using one or more fasteners. In another embodiment, the electrical component 104 is securely affixed to the Junction Box 102 via the tabs using one or more fasteners, e.g., screws. In another embodiment, the electrical component 104 is electrically connected to the Junction Box 102 by connecting to the connectors 118. In another embodiment, the electrical component 104 is at least any one of, but not necessarily limited to, a switch, a single pole single throw (SPST) switch, a three-way switch, a four-way switch, a dimmer switch, or other electrical component or device. In another embodiment, the electrical component 104 may be any one of, but is not limited to, a duplex outlet, a GFI outlet, an arc fault outlet, or other electrical component or device.

Figure 13:
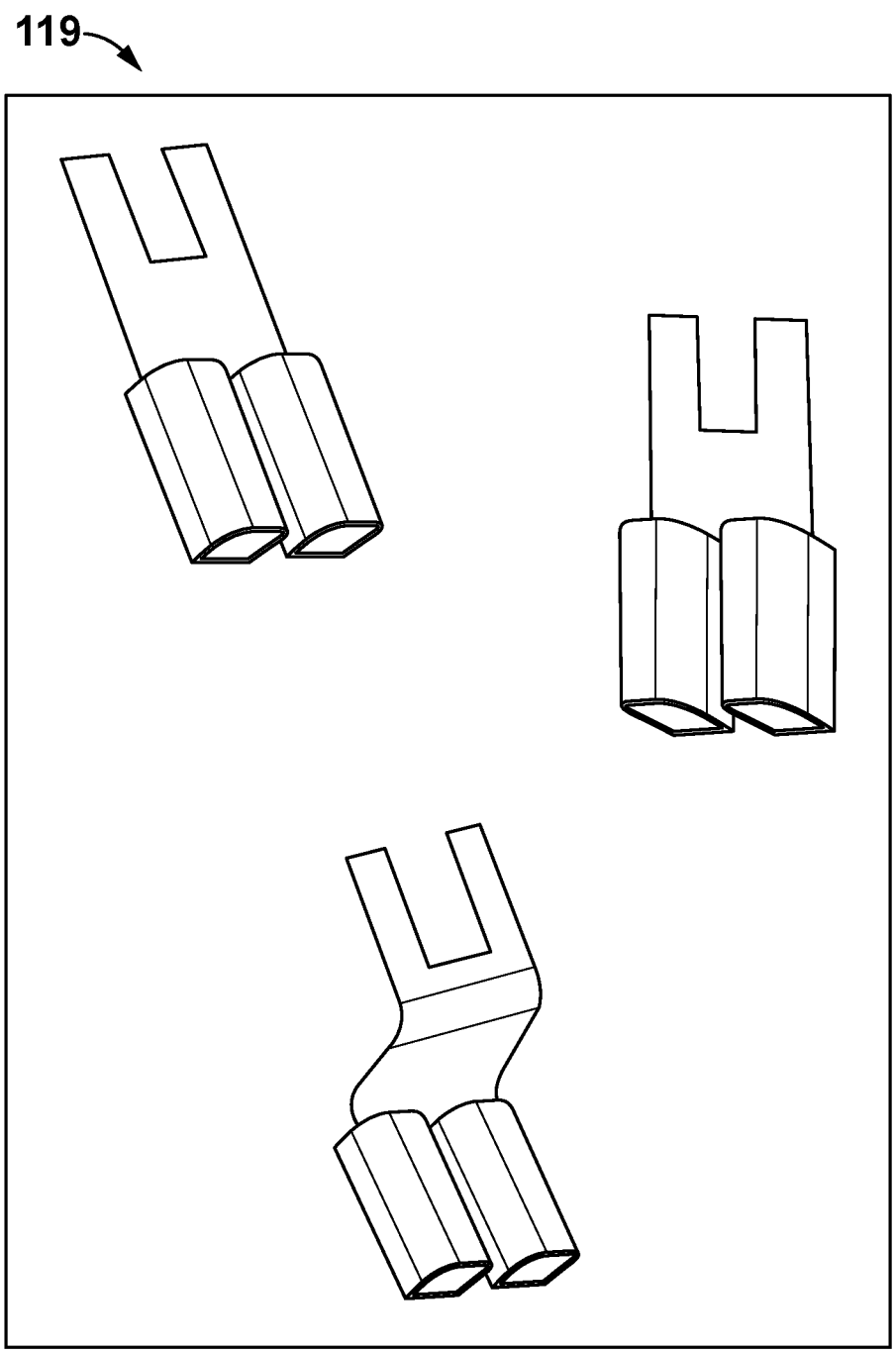
FIG. 13 illustrates a perspective view of outlet terminals of the electrical component In another embodiment of the applicant's innovation.

FIG. 13 discloses another embodiment of the innovation and refers to the outlet terminals 119 of the electrical component 104 (shown in FIG. 12) In another embodiment, an electrical component 104, e.g., an electrical socket is electrically connected to the Junction Box 102 via the outlet terminals 119 and the connectors 118 of the Junction Box 102. In another embodiment, the outlet terminals 119 of the electrical component 104 are metal conductors. In another embodiment, the outlet terminals 119 of the electrical component 104 are metal blade style connectors. The outlet terminals 119 are configured to securely and electrically connect to one or more connectors 118 of the Junction Box 102.

Figure 14:
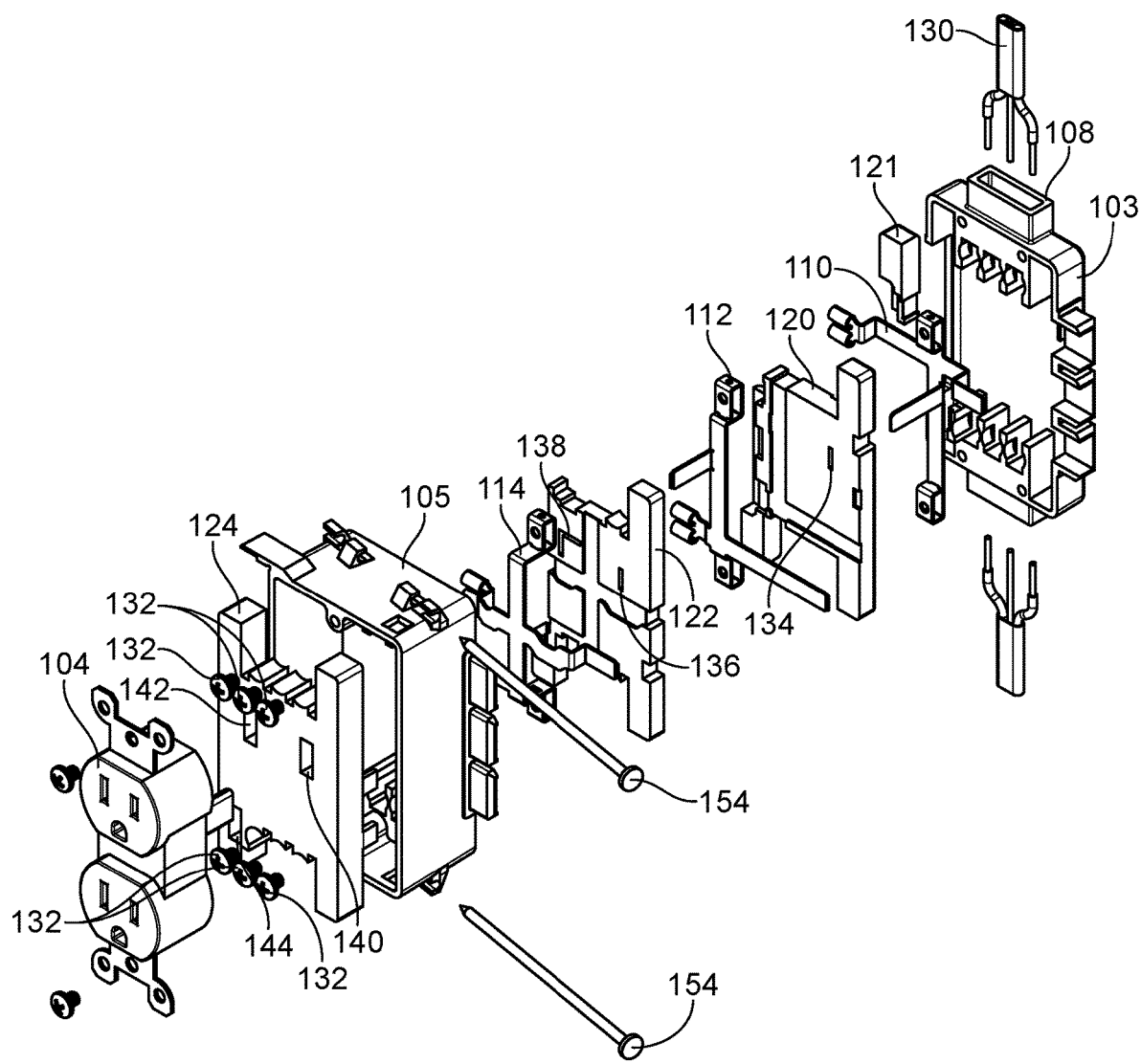
FIG. 14 illustrates an exploded view of the Quick Connect Junction Box.

FIG. 14 discloses another embodiment the innovation and refers to an exploded view of the Quick Connect Junction Box 100. In another embodiment, the conductive traces include, but are not limited to, a hot conductive trace 110, a neutral conductive trace 112, and a ground conductive trace 114 and are securely positioned within the insulating body 106 using one or more insulating plates (120, 121, 122, and 124). In another embodiment, the insulating plates (120, 121, 122, and 124) are configured to receive the conductive traces that include, but are not limited to, a hot conductive trace 110, a neutral conductive trace 112, and a ground conductive trace 114. The insulating plates (120, 121, 122, and 124) separate the conductive traces from each other, thereby improving the insulation strength and preventing short circuit faults within the internal connections. In another embodiment, the insulating plate 120 further comprises at least one opening 134 for allowing the connector 118 of the hot conductive trace 110, enabling an electrical connection between an electrical component 104, e.g., an electrical socket, and the Junction Box 102. In another embodiment, the insulating plate 122 further comprises at least two openings (136 and 138) for allowing the connectors 118 of the hot conductive trace 110 and the neutral conductive trace 112 to enable an electrical connection between an electrical component 104, e.g., an electrical socket, and the Junction Box 102. In another embodiment, the insulating plate 124 further comprises at least three openings (140, 142, and 144) for allowing the connectors 118 of the hot conductive trace 110, the neutral conductive trace 112, and the ground conductive trace 114, to enable an electrical connection between an electrical component and the Junction Box 102. In another embodiment, the insulating plates (120, 121, 122, and 124) are designed in a different shape in order to receive the conductive traces. In another embodiment, the insulating plates (120, 121, 122, and 124) are made of a material that may or would include, but are not limited to, plastic or another suitable insulating material.

In another embodiment, the power lines 130 are electrically connected to the conductive traces via the channels 108 at the top and lower portions of the Junction Box 102. In another embodiment, the bottom section 103 and the top section 105 of the Junction Box 102 are securely affixed via a friction fit and/or fasteners, thereby producing a joint which is held together after the bottom section 103 and top section 105 are pushed together. Further, the electrical component 104, e.g., an electrical socket or other device is securely affixed to the Junction Box 102 via the tabs using one or more fasteners, e.g., screws. In another embodiment, the Junction Box 102 is securely connected to a panel or a wall surface 150 (shown in FIG. 25) using one or more fasteners 154, e.g., nails.

In another embodiment of the innovation, the fasteners 132 are used for screwing the hot conductive trace 110, the neutral conductive trace 112, and the ground conductive trace 114 at the top and bottom portion where the power is brought into the Junction Box 102 and is passed out at the bottom of the Junction Box. In another embodiment, the fasteners 132 are terminal screws that clamp the wires into the hot conductive trace 110, the neutral conductive trace 112, and the ground conductive trace 114. In another embodiment, the hot conductive trace 110, the neutral conductive trace 112, the ground conductive trace 114, and the insulating plates (120, 121, 122, and 124) of the Quick Connect Junction Box 100 may be or could be assembled and incorporated as a single molded part.

Figure 15:
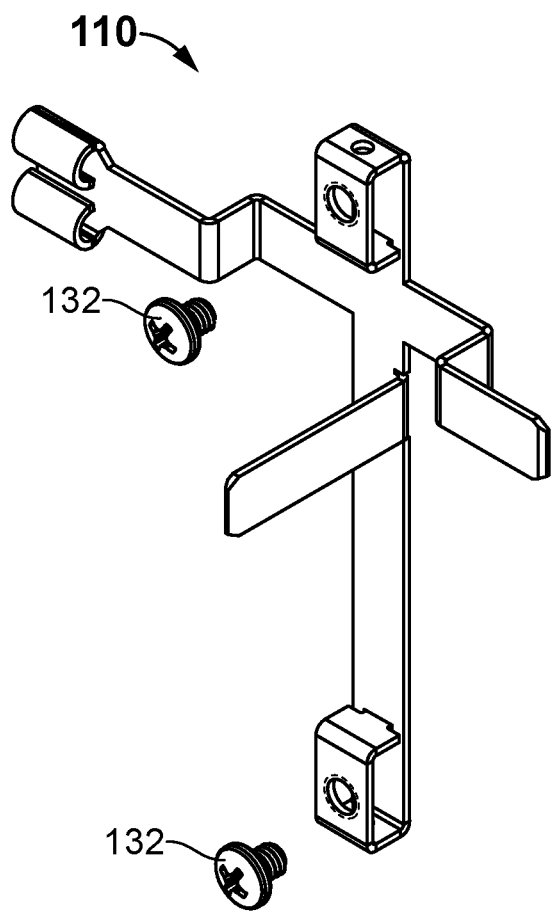
FIG. 15 illustrates a perspective view of a conductive trace, e.g., a hot conductive trace.
Figure 16:
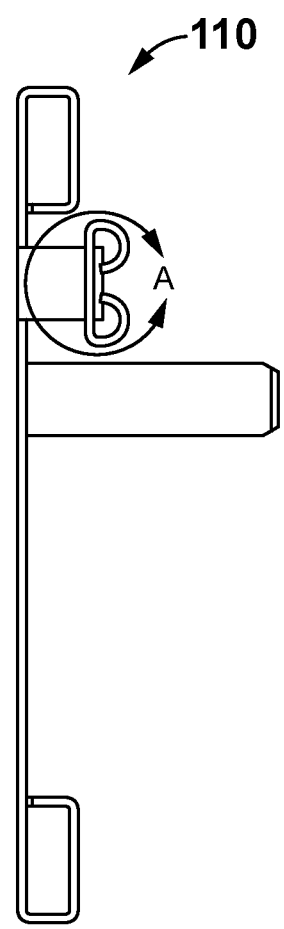
FIG. 16 illustrates a side view of a conductive trace, e.g., a hot conductive trace.
Figure 17:
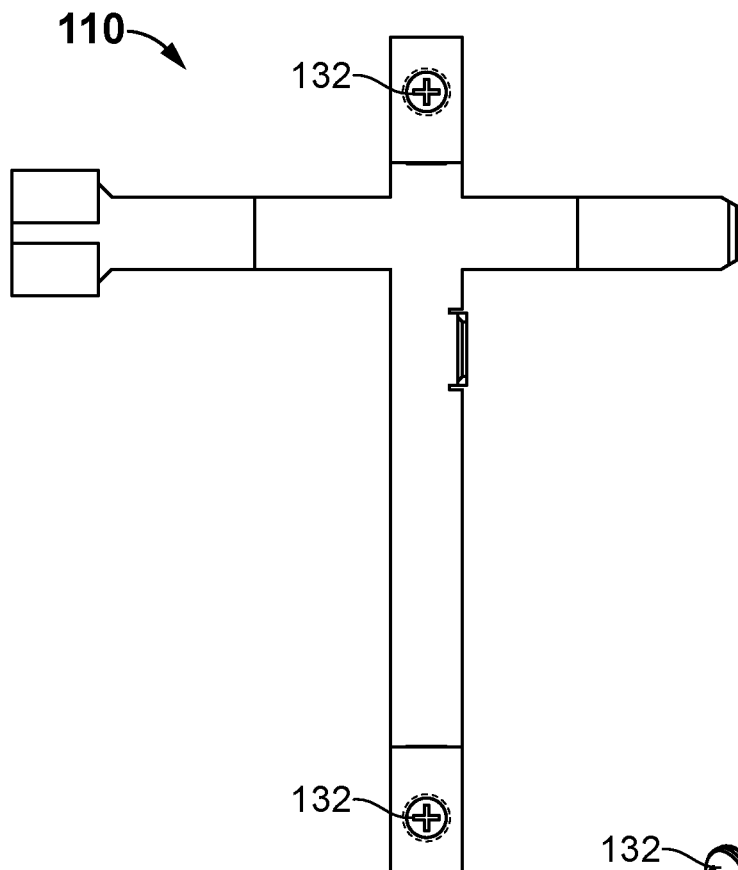
FIG. 17 illustrates a front view of a conductive trace, e.g., a hot conductive trace.

FIGS. 15-17 show different views of the conductive trace 110, i.e., a hot conductive trace. In another embodiment, the conductive trace 110 is positioned within the insulating body using one or more insulating plates. In another embodiment, the conductive trace 110 is positioned within the insulating body using at least one of the screw terminal style connections and back stab connectors. In another embodiment, the conductive trace 110 may be or could be a hot conductive trace.

Figure 18:
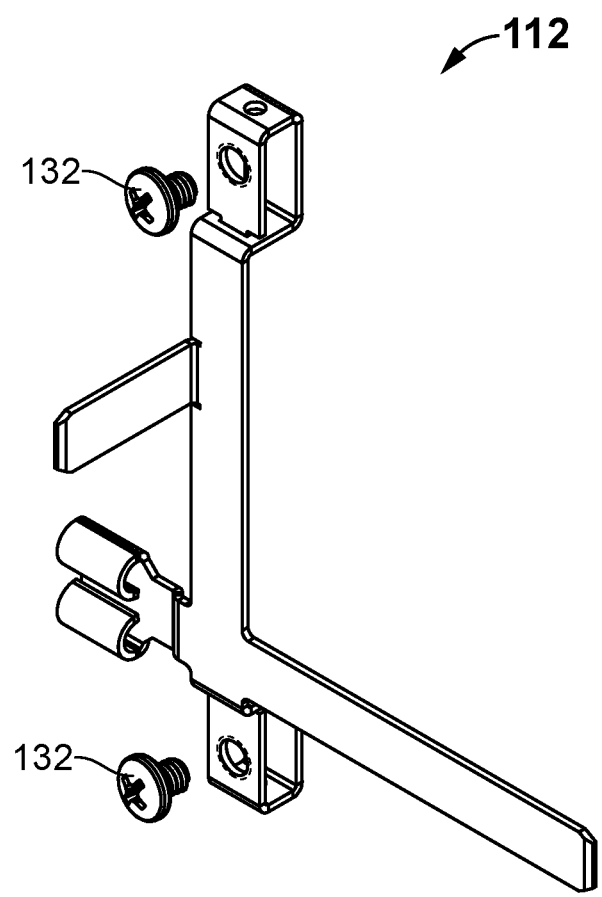
FIG. 18 illustrates a perspective view of a conductive trace, e.g., a neutral conductive trace.
Figure 19:
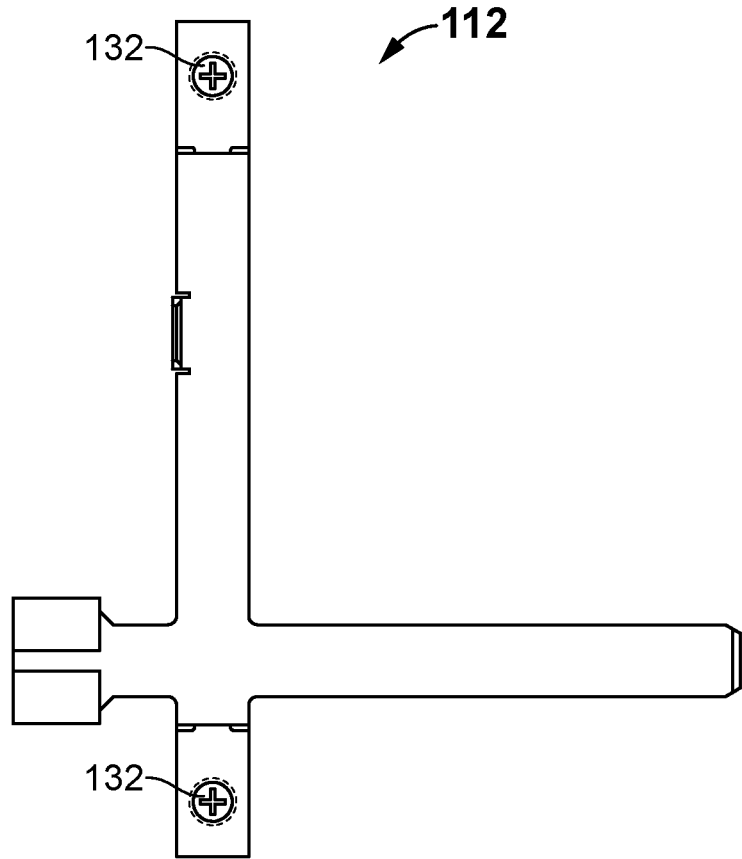
FIG. 19 illustrates a front view of a conductive trace, e.g., a neutral conductive trace.
Figure 20:
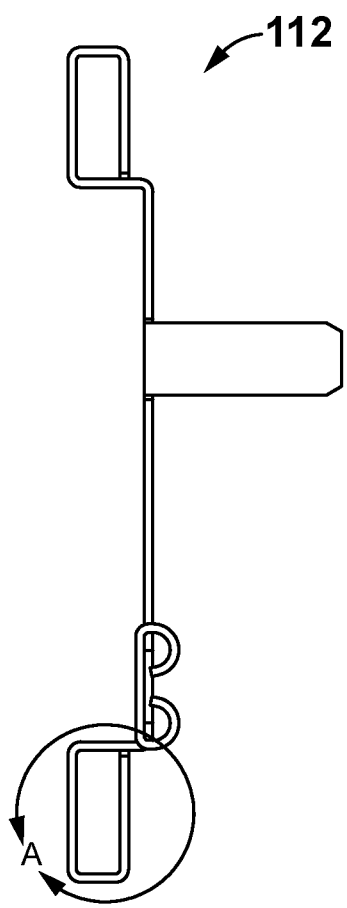
FIG. 20 illustrates a side view of a conductive trace, e.g., a neutral conductive trace.

FIGS. 18-20 show different views of the conductive trace 112, e.g., a neutral conductive trace. In another embodiment of the innovation, the conductive trace 112 is positioned within the insulating body using one or more insulating plates. In another embodiment, the conductive trace 112 is positioned within the insulating body using at least one of the screw terminal style connections and back stab connectors. In another embodiment, the conductive trace 112 could be a neutral conductive trace.

Figure 21:
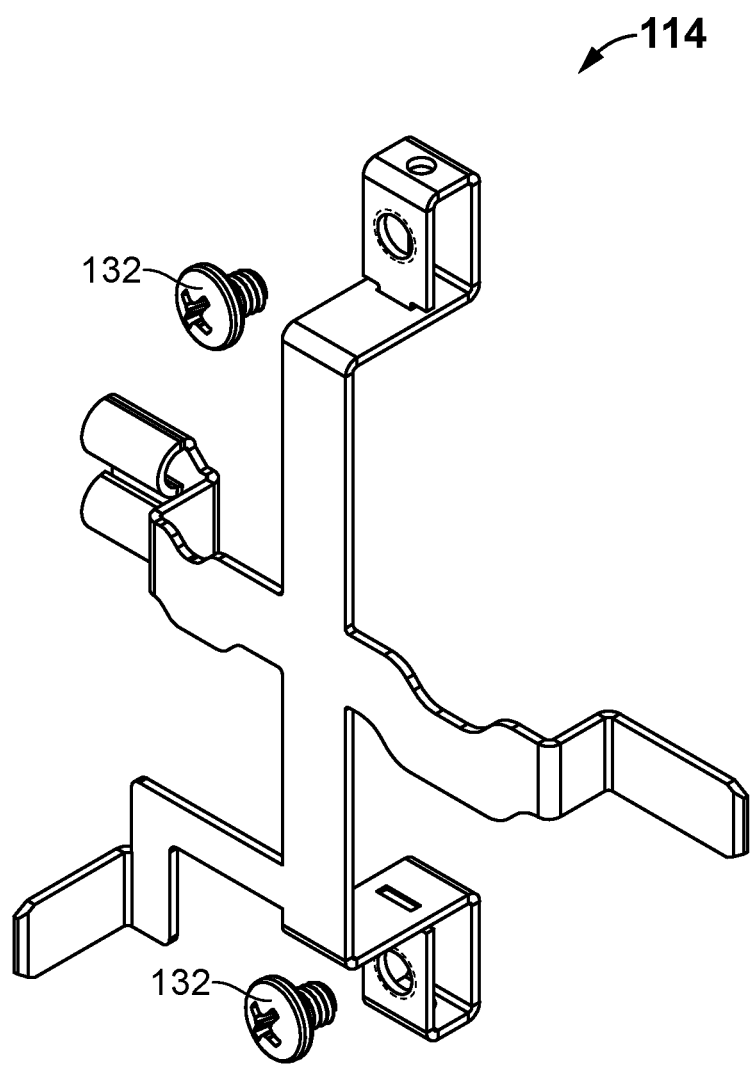
FIG. 21 illustrates a perspective view of a conductive trace, e.g., a ground conductive trace.
Figure 22:
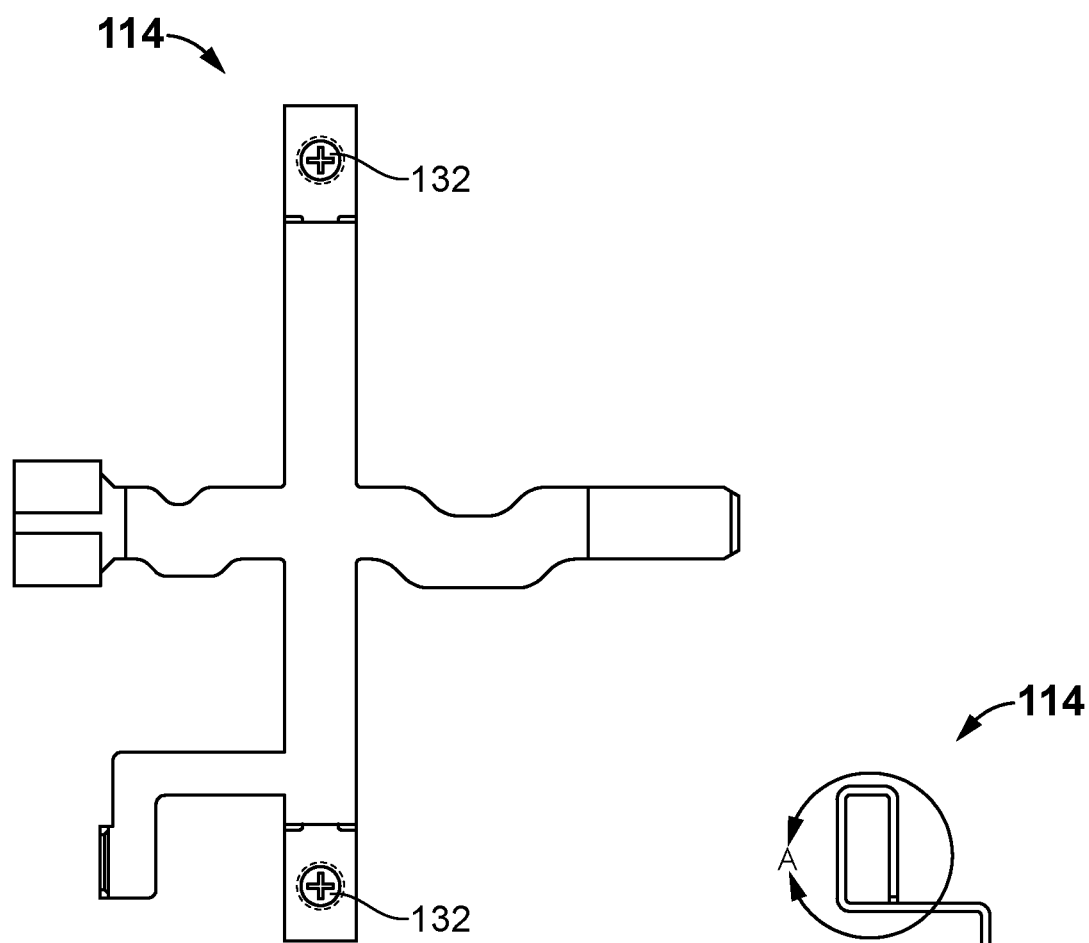
FIG. 22 illustrates a front view of a conductive trace, e.g., a ground conductive trace.
Figure 23:
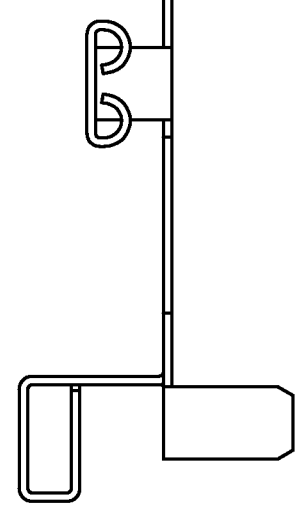
FIG. 23 illustrates a side view of a conductive trace, e.g., a ground conductive trace.

FIGS. 21-23 show different views of a conductive trace 114, e.g., a ground conductive trace. In another embodiment of the innovation, the conductive trace 114 is positioned within the insulating body using one or more insulating plates. In another embodiment, the conductive trace 114 is positioned within the insulating body using at least one of the screw terminal-style connectors and back stab connectors. In another embodiment, the conductive trace 114 is a ground conductive trace.

Figure 24:
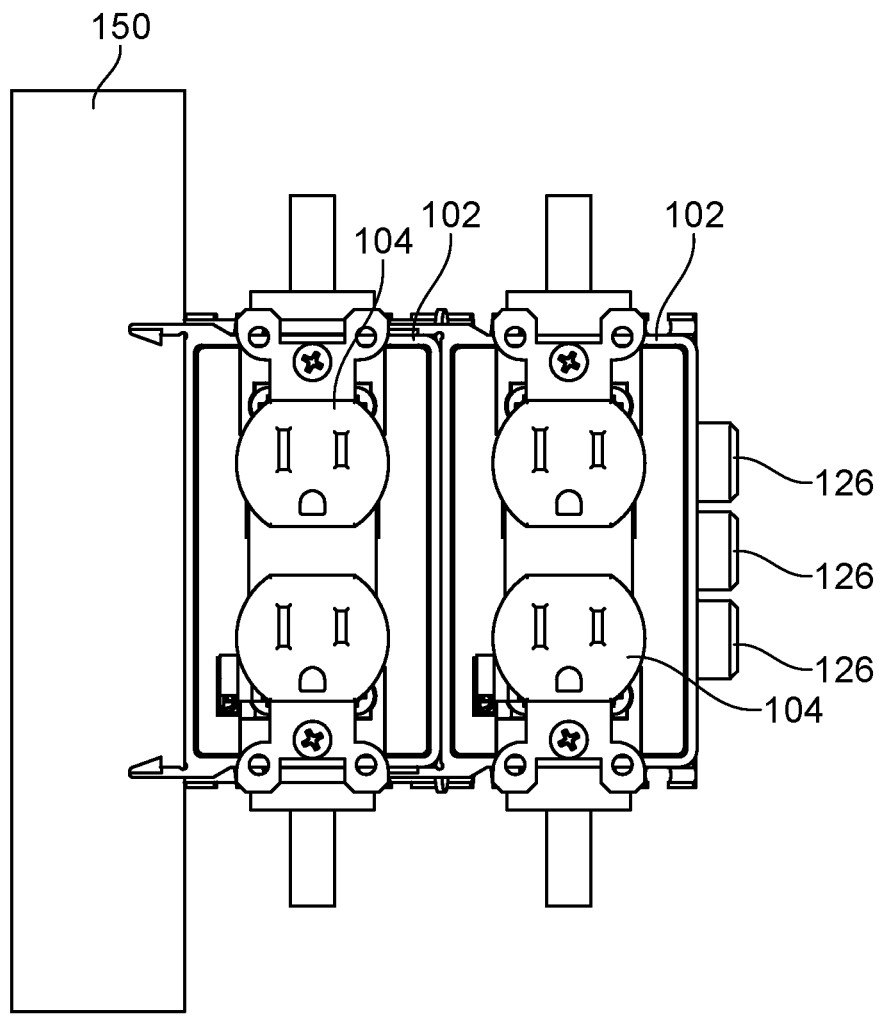
FIGS. 24-25 illustrate a front view and a perspective view of the Junction Box securely connected to an adjacent Junction Box or boxes to form a multi-junction box assembly.
Figure 25:
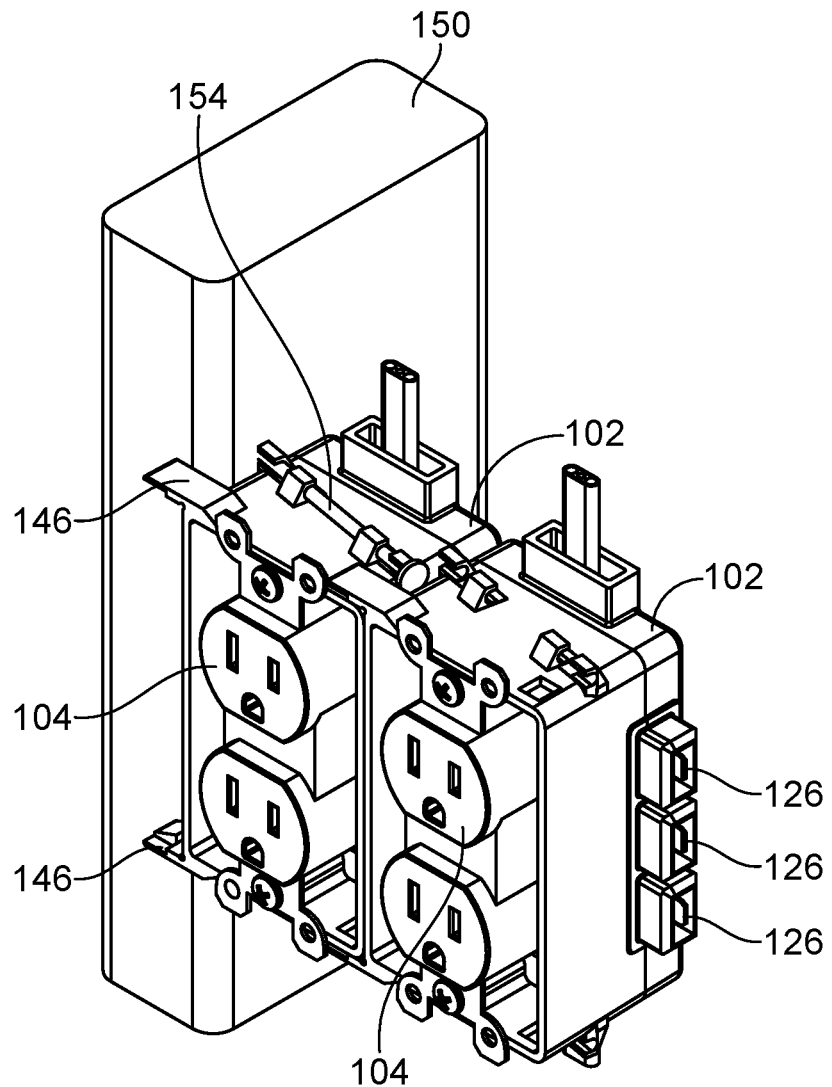

FIGS. 24-25 disclose another embodiment of the innovation and refer to the front view and a perspective view of the Junction Box 102 securely connected to an adjacent Junction Box or boxes to form a multi-junction box assembly. In another embodiment, the Junction Box 102 is configured to securely connect to an adjacent Junction Box or boxes to form a multi-junction box assembly. In another embodiment, the Junction Box 102 further comprises interlocking electrical connectors or internal mating conductors 126 at the side portion for enabling them to electrically connect an adjacent Junction Box or boxes to form a multi-junction box assembly for connecting to various electrical loads. In another embodiment, the Junction Box 102 is securely connected to the panel or a wall, floor, or ceiling surface 150 using one or more fasteners 154, e.g., nails, which are inserted via mounting tabs 152 at the top and bottom portions of the top section 105 (shown in FIG. 14). The mechanical latches 146 are configured to retain and securely support the plugged in adjacent Junction Boxes, which are formed as a multiple junction box assembly.

In another embodiment of the innovation, the Quick Connect Junction Box 100 is capable of expansion to multiple electrical circuits 128 (shown in FIG. 2) and junction boxes 102 through interlocking electrical connectors 126 incorporating power transfer to the adjacent junction box or boxes and subsequent circuits. The expansion of electrical circuits 128 and junction boxes 102 is enabled without the use of jumpers and/or wire nuts.

Figure 26:
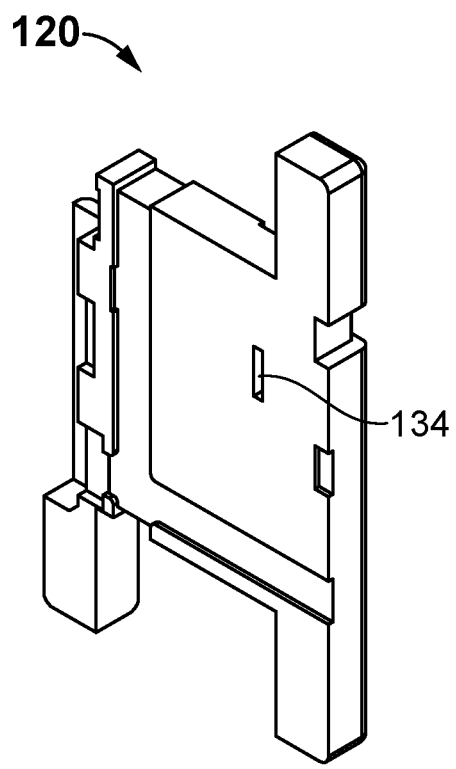
FIGS. 26-27 illustrate a perspective view and a front view of an insulating plate or a first insulating plate for a hot conductive trace In another embodiment of the applicant's innovation.
Figure 27:
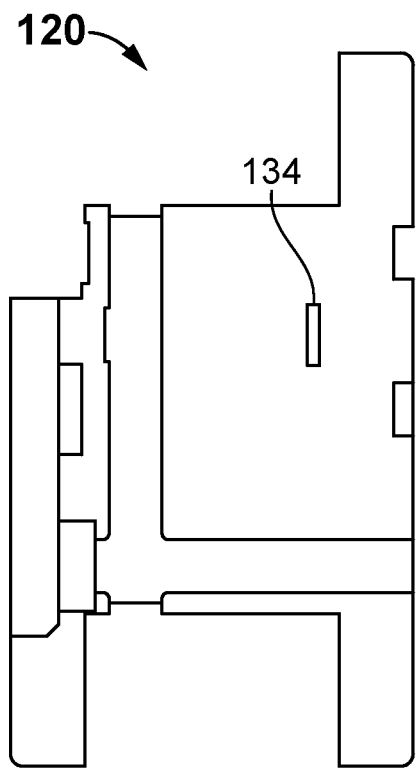

FIGS. 26-27 disclose another embodiment of the innovation and refer to an insulating plate or a first insulating plate 120 for the hot conductive trace 110. In another embodiment, the hot conductive trace 110 is positioned on the inner wall surface of the bottom section 103 of the junction box 102. In another embodiment, the first insulating plate 120 is positioned between the hot conductive trace 110 and the neutral conductive trace 112. The insulating plate 120 is configured to separate the hot conductive trace 110 and the neutral conductive trace 112, thereby improving the insulation strength and preventing short circuit faults within the internal connections. In another embodiment, the insulating plate 120 further comprises at least one opening 134 for allowing the connectors 118 of the hot conductive trace 110 to extend towards the outside of the insulating plate. In another embodiment, the insulating plate 120 could be molded from a material such as plastic or any other suitable insulating material.

Figure 28:
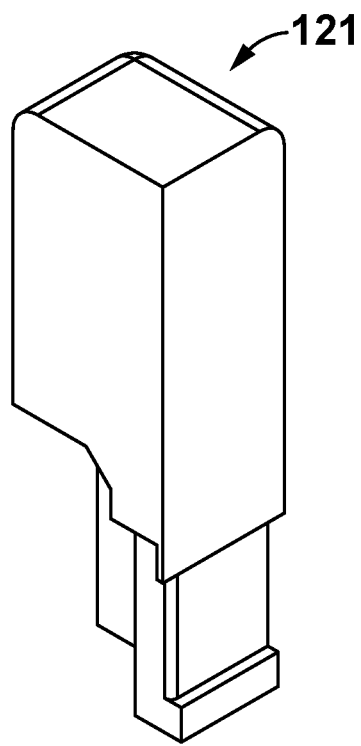
FIGS. 28-29 illustrate a perspective view and a front view of an insulating plate or a second insulating plate In another embodiment of the applicant's innovation.
Figure 29:
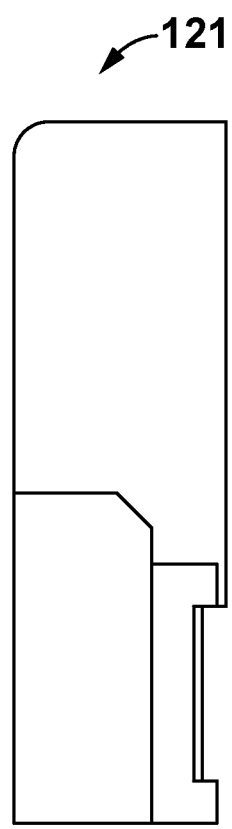

FIGS. 28-29, disclose another embodiment of the innovation and refer to an insulating plate or a second insulating plate 121. In another embodiment, the insulating plate 121 is positioned within the bottom section 103 of the junction box 102 that supports the conductive traces. In another embodiment, the insulating plate 121 could be molded from a material such as plastic or any other suitable insulating material.

Figure 30:
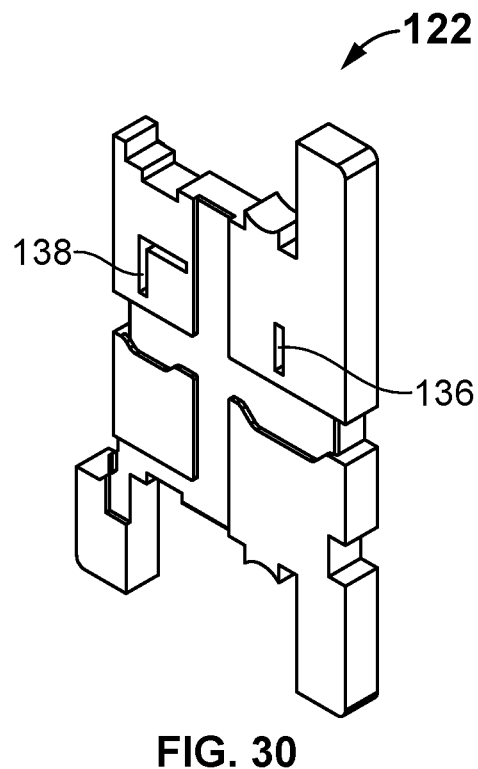
FIGS. 30-31 illustrate a perspective view and a front view of an insulating plate or a third insulating plate for a hot conductive trace and a neutral conductive trace In another embodiment of the applicant's innovation.
Figure 31:
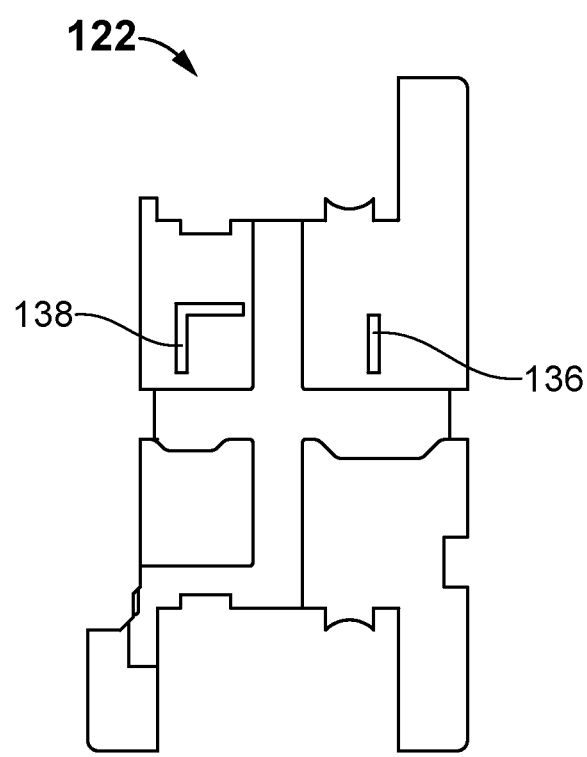

FIGS. 30-31 disclose another embodiment of the innovation and refer to an insulating plate or a third insulating plate 122 for the hot conductive trace 110, and the neutral conductive trace 112. In another embodiment, the third insulating plate 122 is positioned between the neutral conductive trace 112 and the ground conductive trace 114. The third insulating plate 122 is configured to separate the neutral conductive trace 112 and the ground conductive trace 114, thereby improving the insulation strength and preventing short circuit faults within in the internal connections. In another embodiment, the third insulating plate 122 further comprises at least two openings (136 and 138) for allowing the outlet terminals 118 of the hot conductive trace 110 and the neutral conductive trace 112 to extend toward the outside of the insulating plate. In another embodiment, the third insulating plate 122 could or may be molded from a plastic material or any other suitable insulating material.

Figure 32:
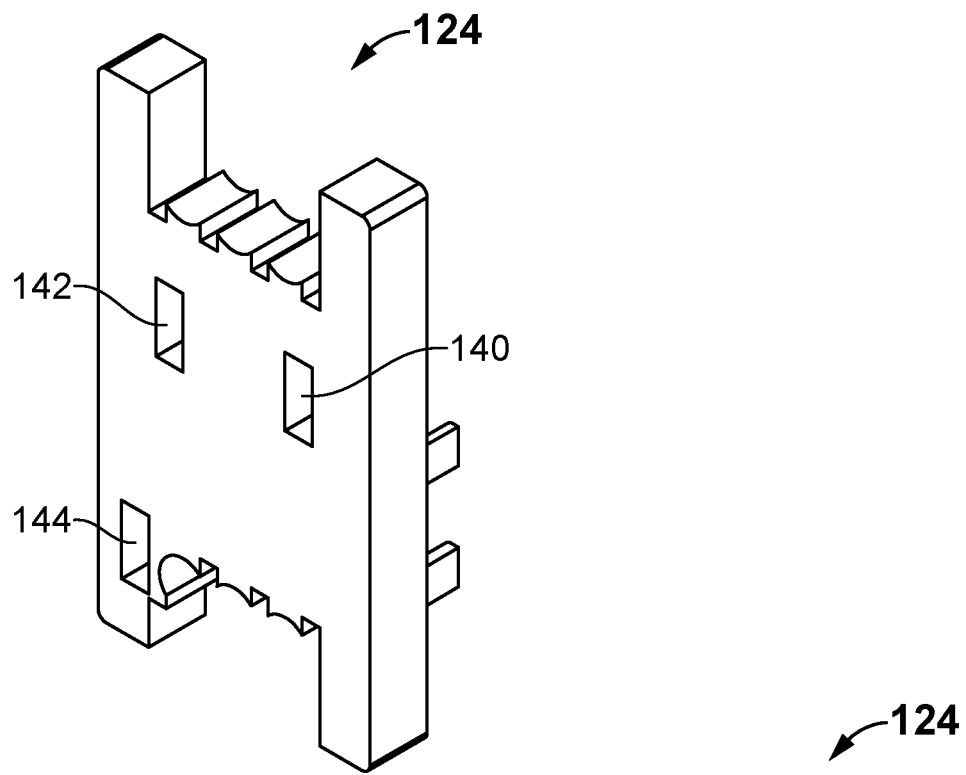
FIGS. 32-33 illustrate a perspective view and a front view of an insulating plate, or a fourth insulating plate of the Junction Box
Figure 33:
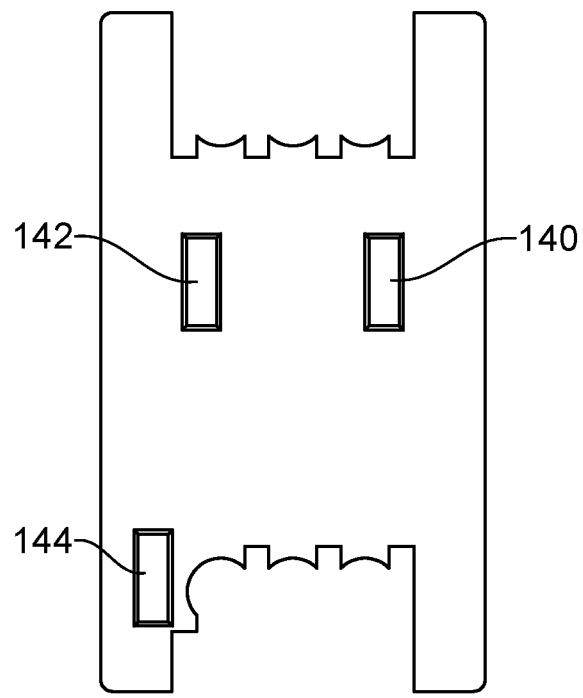

FIGS. 32-33 show another embodiment of the innovation and disclose an insulating plate or a fourth insulating plate 124 of the Junction Box 102. In another embodiment, the fourth insulating plate 124 is positioned on the top of the ground conductive trace 114. In another embodiment, the insulating plate 124 further comprises at least three openings (140, 142, and 144) allowing the outlet terminals 118 of the hot conductive trace 110, the neutral conductive trace 112, and the ground conductive trace 114 to enable an electrical connection between an electrical component 104, e.g., an electrical socket, and the Junction Box 102. The fourth insulating plate 124 could or will improve the insulation strength and also prevent short circuit faults within the internal connections. In another embodiment, the fourth insulating plate 124 could be molded from a plastic material or any other suitable insulating material.

The advantages of the applicant's innovation include an electrical component or device 104 that can be more easily inserted or plugged into the Junction Box 102, thereby simplifying the installation of the Quick Connect Junction Box 100 in a residential, medical, industrial, institutional, office, commercial, or other type of building in less time, and more safely. And, since electricians would spend less time installing the Quick Connect Junction Box, installation costs should be reduced by approximately ninety percent (90%). (The applicant and his engineering team confirmed this 90% cost reduction with a number of time-and-motion studies and by conferring with licensed electricians. Also, since the applicant's Junction Boxes eliminate excess copper wire "pig tails," the applicant's Junction Boxes will save approximately 150 feet of copper wire per newly constructed 2,300 square foot home.) Additionally, the Quick Connect Junction Box 100 enables the non-skilled installer or electrician to easily, quickly, and safely install an electrical component 104, e.g., a switch or a duplex outlet to the Junction Box 102 and/or another component or device. The electrical circuit of the Junction Box 102 is configured to allow a user to easily, quickly, and safely connect to the power line using one or more conductors, without having to use wire nuts, but rather connecting the screw terminals 132 shown in FIG. 2, with only a screwdriver, thereby reducing or eliminating the possibility of contacting a live wire. An electrician or other worker or end user could install any or all formats without being skilled in schematics or internal junction box wiring methods. The Quick Connect Junction Box 100 may also be incorporated into a smart electrical grid, a Blockchain based electrical grid system, an Artificial Intelligence (AI) based device and system, and/or Internet of Things (IoT) based devices and systems.

The Quick Connect Junction Box 100 is configured to employ the practice of "poke-yoke" to reduce the ability of error in wiring, populating, and assembling any wall, floor, or ceiling outlet units comprised of an internal component and a Junction Box. The Quick Connect Junction Box 100 is capable of expansion to multiple circuits and Junction Boxes through interlocking mechanical and electrical connectors, incorporating power transfer to the adjacent Junction Box or boxes and subsequent circuits, thereby enabling expansion of circuits and Junction Boxes without the use of jumpers and wire nuts (think Legos). The Quick Connect Junction Box 100 is configured such that it could be or may be inserted into a metal enclosure thereby meeting potential commercial, nonresidential, or industrial electrical codes. The Quick Connect Junction Box 100 allows an electrician, worker, or end-user to populate and install virtually all electrical system formats without being skilled in schematics or internal junction box wiring methods.

Preferred embodiments of this innovation are described herein, including the best mode known to the applicant for carrying out the innovation. It should be understood that the illustrated embodiments are exemplary only and should not be taken as limiting the scope of the innovation.

The foregoing description comprises illustrative embodiments of the applicant's innovation. Having thus described exemplary embodiments of the applicant's innovation, it should be noted by those skilled in the art that the within disclosures are exemplary only, and that various other alternatives, adaptations, and modifications may be made within the scope of the applicant's innovation. Merely listing or numbering the steps of a method in a certain order does not constitute any limitation on the order of the steps of that method. Many modifications and other embodiments of the innovation will come to mind to one skilled in the art to which this innovation pertains, having the benefit of the teachings in the foregoing descriptions. Although specific terms may be employed herein, they are used only in generic and descriptive sense and not for purposes of limitation. Accordingly, the present innovation is not limited exclusively to the specific embodiments illustrated herein.

What is claimed is:

1. A Quick Connect Junction Box incorporated as a single molded part, that comprises:
   a Junction Box having an insulating body with a cavity, wherein the Junction Box is configured to securely fasten to a support surface, wherein the insulating body of the Junction Box comprises:
      a bottom section and a top section, wherein the bottom section and top section are configured to fasten together via tabs using one or more fasteners, thereby forming the Junction Box; an electrical circuit with internal connections securely positioned within the insulating body and electrically connected to an input power line using one or more conductors via input connections through a channel, wherein the electrical circuit is formed with one or more conductive traces;

one or more connectors extended from the one or more conductive traces, wherein the one or more connectors are outwardly positioned at a center portion of the insulating body of the Junction Box;

wherein the one or more conductive traces are separately positioned within the insulating body of the Junction Box using one or more insulating plates and fasteners;

wherein the one or more conductive traces and the one or more insulating plates incorporated as a single molded part;

an electrical component having an insulating body with an electrical circuit and one or more connectors, securely affixed to the Junction Box via mounting tabs using one or more fasteners, thereby securely and electrically connecting the electrical component to the Junction Box via the one or more connectors and outlet terminals of the electrical component, so as to distribute electrical power to electrical loads, and one or more interlocking electrical connectors at a side location for supplying electrical power from the Junction Box to an adjacent Junction Box by utilizing the one or more conducting traces.

2. The Junction Box of claim 1, wherein the one or more insulating plates of the Junction Box are configured to receive at least one conductive trace and separate them from each other for improving the insulation strength and preventing short circuit faults.

3. The following is an examiner's statement of reasons for allowance: the prior art fails to provide, teach or suggest the electrical circuit is formed with one or more conductive traces; the one or more conductive traces are separately positioned within the insulating body of the Junction Box using one or more insulating plates; the one or more conductive traces and the one or more insulating plates incorporated as a single molded part; and in combination with all other limitations in claim 1.

4. The Junction Box of claim 1, wherein the one or more conductive traces are separately positioned within the insulating body of the Junction Box using at least any one of screw terminal-style connections and back stab connectors.

5. The Junction Box of claim 1, wherein the electrical circuit with internal connections of the Junction Box is incorporated within the insulating body via a molding, process.

6. The Junction Box of claim 1, wherein the input connections of the Junction Box are push-in connectors.

7. The Junction Box of claim 1, wherein the one or more outlet terminals of the electrical component are metal electrical conductors.

8. The Junction Box of claim 1, wherein the one or more outlet terminals of the electrical component are metal blade-style connectors.

9. The Junction Box of claim 1, wherein the one or more outlet terminals of the electrical component are configured to securely and electrically connect to one or more connectors within the Junction Box.

10. The Junction Box of claim 1, wherein the electrical component is at least any one of a switch, a single pole single throw (SPST) switch, a three-way switch, a four-way switch, a dimmer switch, or other similar electrical component or device.

11. The Junction Box of claim 1, wherein the electrical component consists of a duplex outlet, a GFI outlet, an arc fault outlet, or other electrical component or device.

12. The Junction Box of claim 1, wherein the Junction Box is made of plastic, an electrical insulating material, and/or other suitable insulating material or composite.

13. The Junction Box of claim 1, wherein the Junction Box further comprises one or more mechanical latches at a top location and a bottom location, wherein the one or more mechanical latches are configured to retain and securely support the plugged in Junction Boxes.

14. The Junction Box of claim 13, wherein the mechanical latches are molded from the top location and the bottom location of the insulating body of the Junction Box.

\* \* \* \* \*

UNITED STATES PATENT AND TRADEMARK OFFICE
CERTIFICATE OF CORRECTION

| | | |
|---|---|---|
| PATENT NO. | : 11,070,040 B1 | Page 1 of 1 |
| APPLICATION NO. | : 17/159584 | |
| DATED | : July 20, 2021 | |
| INVENTOR(S) | : Robert Garrasi et al. | |

It is certified that error appears in the above-identified patent and that said Letters Patent is hereby corrected as shown below:

On the Title Page

Under item (12), "Garrasi" should read --Garrasi et al.--

Item (72), add --CLAY C. COOPER, III, Clifton Park, NY (US); DOUGLAS VROOMAN, II, Boynton Beach, FL (US)--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*